United States Patent [19]
Ellis

[11] 3,789,358
[45] Jan. 29, 1974

[54] POLICE UTILITY BAR

[76] Inventor: Richard D. Ellis, 6714 Dudley Ave., North, Minneapolis, Minn. 55428

[22] Filed: Feb. 23, 1972

[21] Appl. No.: 228,666

[52] U.S. Cl.................. 340/87, 224/42.1 R, 340/50
[51] Int. Cl............................................... B60q 1/52
[58] Field of Search... 325/117; 224/42.1 R, 42.1 D, 224/42.1 E, 42.1 F, 42.1 G; 340/22, 47, 50, 74, 75, 76, 81 R, 84, 87, 89

[56] References Cited
UNITED STATES PATENTS

| | | |
|---|---|---|
| 3,271,735 | 9/1966 | Gosswiller............................ 340/50 |
| 3,278,741 | 10/1966 | Wood............................. 240/52.1 X |
| 3,404,371 | 10/1968 | Gosswiller............................ 340/87 |
| 3,460,728 | 8/1969 | Adamson....................... 224/42.1 R |
| 3,487,360 | 12/1969 | Thompson............................ 340/87 |
| 3,522,584 | 8/1970 | Talbot............................. 340/87 X |
| 3,677,451 | 7/1972 | Burland......................... 224/42.1 F |

FOREIGN PATENTS OR APPLICATIONS

| | | |
|---|---|---|
| 1,479,803 | 3/1967 | France............................ 340/114 B |

Primary Examiner—John W. Caldwell
Assistant Examiner—Kenneth N. Leimer
Attorney, Agent, or Firm—Wicks & Nemer

[57] ABSTRACT

A police utility bar arranged to be mounted across the roof of a police car including a generally "T" shaped hollow housing, twin rotating lights, and a radio antenna mounted on the top surface of the housing, front running lights and a siren mounted in apertures in the front side of the housing, rear running lights mounted in apertures in the rear side of the housing, twin search lights pivotally mounted on the ends of the "T" shaped housing, and two mounting bosses arranged on the bottom surface of the housing to mount and support the utility bar on the roof of the police car in connection with arms extending from the bosses to the roof of the police car and in connection with straps extending from the bosses to the rain gutter of the police car with the lights and siren arranged to be operated and controlled from within the police car.

6 Claims, 4 Drawing Figures

PATENTED JAN 29 1974  3,789,358
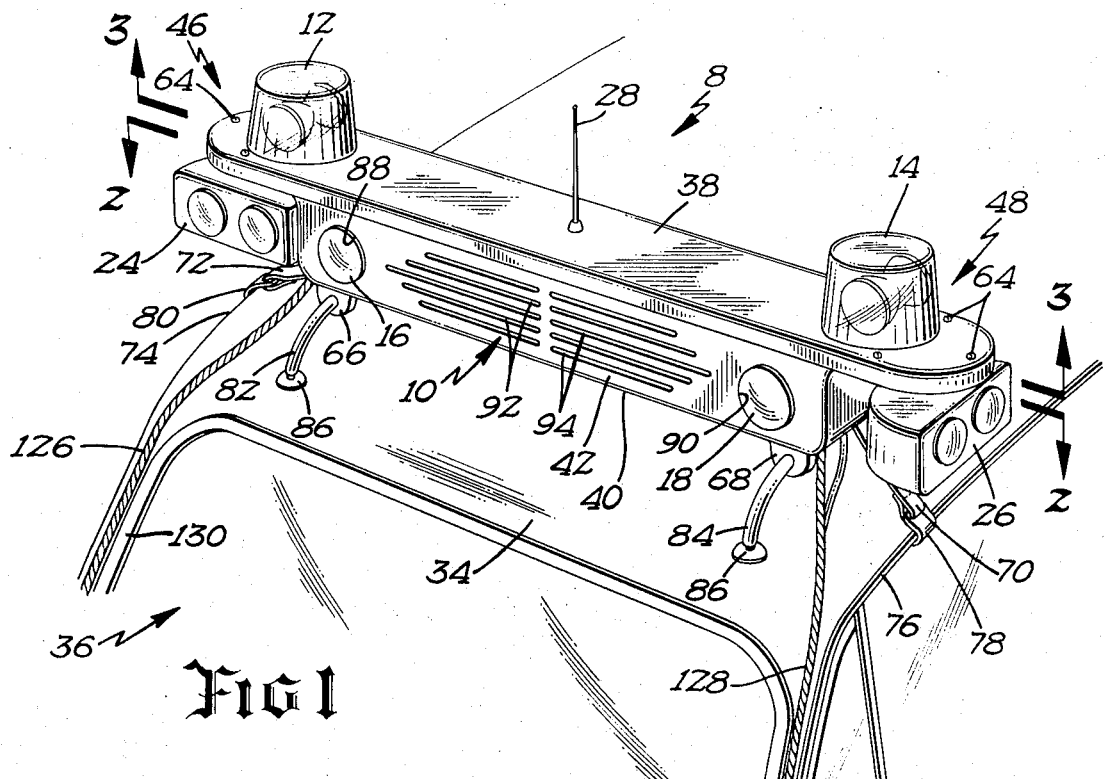
Fig 1
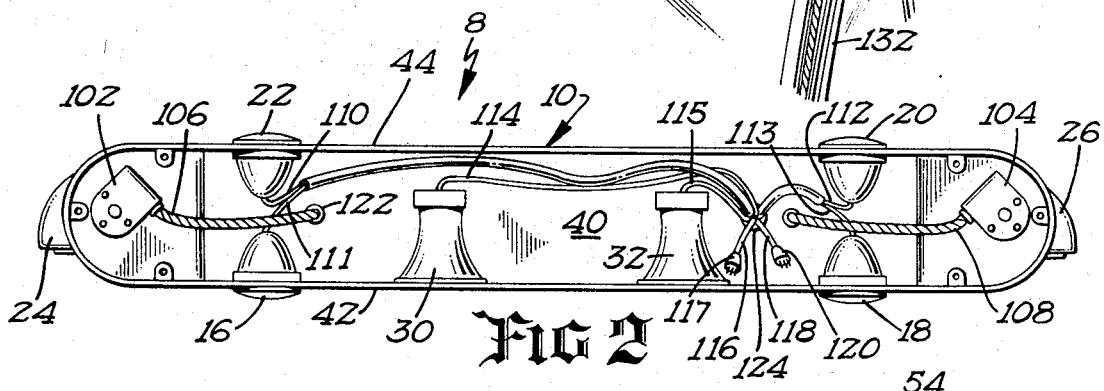
Fig 2
Fig 3
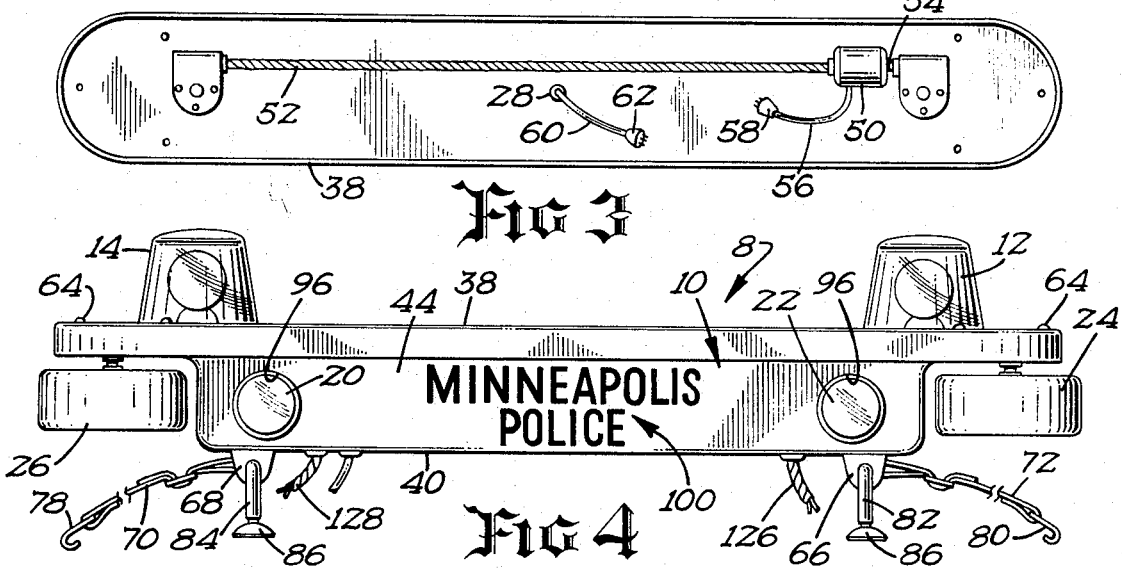
Fig 4

POLICE UTILITY BAR

BACKGROUND

The present invention relates generally to police vehicles, more specifically to lights and other visual and audio equipment which may be carried by a police car, and still more particularly to a police utility bar devised and arranged to carry and support the lights and other equipment deemed necessary for a police car in one compact, readily installed, readily transferrable unit.

In the past, various of the lights and other equipment carried by police cars have been attached by drilling holes in the cosmetic surface of the car or by attachment through the use of screws, bolts, or other means, or otherwise defacing the cosmetic surface of the police car. Defacing of the cosmetic surface can substantially affect the resale value of the car and hence the value to the police department possessing the car.

Further, in the past, many of the individual pieces of equipment were separately installed.

Thus, past techniques were both inefficient and costly.

SUMMARY

The present invention solves these and other problems in providing appropriate lights and other equipment for use by police cars by providing, in the preferred embodiment, a novel police utility bar incorporating front and rear running lights, twin top rotating lights and antenna, a siren, and twin, side, pivoting spot lights to illuminate the environment around and about the police car.

In particular, a preferred embodiment of the present invention includes a hollow, generally "T" shaped housing having top, bottom, front, and rear surfaces, and left and right projecting ends as in the horizontally arranged portions of the "T." The horizontally arranged portions of the "T" are arranged to support the pivotally mounted twin search lights. The top surface is arranged to operatively mount the twin rotating lights and the antenna. The front side is arranged to operatively mount the twin red running lights and the siren. The rear side is arranged to operatively mount the twin amber running lights. Two bosses are arranged on the bottom surface to allow the support of the utility bar on the roof of the police car through the use of arms extending from the bosses, front and rear, to the roof of the police car and by straps extending between the bosses and the rain gutter of the police car.

Cables and wires from the lights, siren, and antenna are arranged to descend along the front door post, enter the motor compartment through the hood opening, and extend through the fire wall of the police car into the interior of the car to allow the operation and manipulation of all equipment and lights from the driver and passenger positions in the front seat of the police car. It is to be noticed that such an arrangement allows remote control without damage to the cosmetic surface of the car.

Further, the rear surface of the police utility bar of the present invention allows significant space for the imprinting of the name of the particular police department possessing the police car thus further avoiding any defacement of the cosmetic surface of the car.

Therefore, the police utility bar of the present invention operatively mounts lights and other equipment necessary to the functioning of the police car in a manner that it may be quickly installed and quickly removed all with little or no damage to the cosmetics of the car such as holes and other defacements.

It is thus an object of the present invention to provide a novel police utility bar.

It is a further object of the present invention to provide a novel police utility bar in a single unit.

It is a further object of the present invention to provide a novel police utility bar in a single unit which may be rapidly installed and rapidly removed without cosmetic damage to the car.

It is a further object of the present invention to provide a novel police utility bar in a single unit including rotating spot lights to illuminate the environment around and about the police car while being manipulated and controlled from within the police car.

It is a further object of the present invention to provide a novel police utility bar in a single unit providing space for the imprinting of the designation of the possessor police department for rapid and clear identification.

These and further objects and advantages of the present invention will become clearer in the light of the following detailed description of an illustrative embodiment of this invention described in connection with the drawings.

DESCRIPTION OF THE DRAWINGS

FIG. 1 is a front perspective view of the novel police utility bar of the present invention shown in place upon a portion of the roof of a police car.

FIG. 2 shows a sectional view of the police utility bar of FIG. 1 according to the section lines 2—2 in FIG. 1.

FIG. 3 shows a sectional view of the police utility bar of FIG. 1 according to the section line 3—3 in FIG. 1.

FIG. 4 shows a back view of the police utility bar of FIG. 1.

DESCRIPTION

In the figures, a police utility bar, generally designated 8, is shown as including a housing, generally designated 10, mounting rotating lights 12 and 14, front red running lights 16 and 18, rear amber running lights 20 and 22, left search lights 24, right search lights 26, radio antenna 28, and twin sirens 30 and 32. Police utility bar 8 is shown as mounted upon the roof, generally designated 34 of a police car, generally designated 36, by means which will be explained hereinafter.

In particular, housing 10 includes a top 38, a bottom 40, a front side 42, and rear side 44, and ends generally designated 46 and 48.

Top 38, in the preferred embodiment shown, operatively mounts twin rotating lights 12 and 14 and allows their control and manipulation. As best seen in FIG. 3, the controls for rotating lights 12 and 14 include an electrically controlled drive motor 50 interconnected to the rotating lights 12 and 14 by drive cables 52 and 54. Electric power for rotating lights and the drive motor 50 is provided through a control cable 56 including a plug 58 to allow separation of the top 38 from the remaining portions of the housing 10. Top 38 further operatively mounts an antenna 28 which connects with an antenna cable 60 and a plug 62 to also allow a separation of top 38 from the remaining portions of housing 10. Top 38 is fixed to the remainder of housing 10 by a plurality of screws 64.

Two bosses 66 and 68 are attached to the bottom 40. Bosses 66 and 68 include attachments for straps 70 and 72 which extend between the bosses and the left and right rain gutters 74 and 76 of the police car 36 and attach thereto by means of gutter clips 78 and 80. A pair of arms 82 and 84 extend through bosses 66 and 68 frontward and rearward of housing 10 to terminate in suction cups 86 affixed to each end of arms 82 and 84.

Front side 42 includes apertures 89, 90, 92, and 94 defined therethrough with front running lights 16 and 18 operatively mounted adjacent apertures 88 and 90 to expose the running lights to the exterior of the housing 10 and cause the running lights to be visible on the exterior of the housing. Sirens 30 and 32 are similarly mounted adjacent apertures 92 and 94 in a manner to allow sound from the sirens to be heard.

Similarly, rear side 44 includes apertures 96 and 98 mounting rear running lights 20 and 22. Further, rear side 44 includes substantial space for the printing of the indicia of identification for the particular police department possessing the police car. For example, as best seen in FIG. 4, the indicia, generally designated 100, "MINNEAPOLIS POLICE" has been applied to the rear surface 44 of the housing 10.

As best seen in FIG. 2, ends 46 and 48 which form the left and right horizontal extensions of the "T" sections of housing 10 support and operatively mount controls 102 and 104 for the pivoting search lights 22 and 24. Controls 102 and 104 in turn are connected by control cables 106 and 108 to the manipulative controls, not shown, located within the interior of the police car.

Electrical cables 110, 111, 112, 113, 114, and 115, antenna cable 116 including plug 117, rotating light cables 118 including plug 120, and search light control cables 106 and 108 leave housing 10 through apertures 122 and 124 in the bottom 40 to form two control and manipulation cables 126 and 128 which cables extend down the front door posts 130 and 132 of police car 36, into the motor area of police car 36 through the hood opening, from the motor area into the interior passenger carrying compartment through the fire wall, and to manipulative controls situated for operation by the driver and the passenger.

OPERATION

Generally, the police utility bar of the present invention includes a top 38, bottom 40, front side 42, and rear side 44 formed into a hollow parallelepiped with ends 46 and 48 extending leftward and rightward of the parallelepiped portion to form left and right horizontal extensions of the "T" shaped housing 10. By extending in this manner, the mounting of the search lights 24 and 26 allows them to pivot upward and downward with respect to the housing 10, and rotate front and rear with respect to the housing 10, to allow the occupants of police car 36 to aim a directionalized beam of light to selectively illuminate the environment around and about the police car. With a separation of the control cables, 126 and 128, each search light can be separably controlled and manipulated as desired. In the preferred embodiment, one control terminates adjacent each of the passengers, normally two, in the front seat of the police car to allow each a separately controllable search light adjacent his side of the car.

As can now be seen, housing 10 is positioned on the roof 34 of police car 36 with top 38 and bottom 40 arranged in a generally horizontal position parallel to the plane of the roof 34 of police car 36 and perpendicular to the intended direction of motion of police car 36 and vertically spaced from each other. Also, front side 42 and rear side 44 are arranged in a generally vertical position extending between the top 38 and bottom 40 and perpendicular to the plane of the roof 34 of police car 36 and the intended direction of motion of police car 36. The police utility bar 8 of the present invention is then supported upon suction cups 86 affixed to the ends of arms 82 and 84 extending from bosses 66 and 68 interconnected with the bottom 40 of housing 10. Straps 70 and 72 are tightened between rain gutters 74 and 76 and bosses 66 and 68 to firmly affix the police utility bar of the present invention to the top 34 of police car 36.

When installing the police utility bar 8 of the present invention, appropriate cabling will then be installed as indicated above and the unit is ready to operate. As can further now be appreciated, the police officers situated on the front seat of the car can selectively energize and manipulate the twin top rotating lights 12 and 14, the front running lights 16 and 18, the rear running lights 20 and 22, the search lights 24 and 26, the reception from the police radio antenna 28, and the police sirens 30 and 32. By selectively operating the controls situated at the end of the respective electric and mechanical cables extending from the police utility bar 8 of the present invention into the interior of the police car, the desired effect can be had.

It can now be seen that there are no holes or other destruction or defacement of the cosmetics of the police car and the police utility bar of the present invention can be rapidly and inexpensively installed and removed.

Now that the basic teachings of the present invention have been explained, many extensions and variations will be obvious to anyone having ordinary skill in the art. Thus, since the invention disclosed herein may be embodied in other specific forms without departing from the spirit or general characteristics thereof, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. Police utility bar for mounting on the roof of a police car having a roof, comprising in combination: a hollow housing including a horizontal top surface, a horizontal bottom surface spaced from and below the top surface and having at least one aperture formed therein, a vertical front side connected between the top surface and the bottom surface, a vertical rear side connected between the top surface and the bottom surface and spaced from the front side, and left and right vertical ends connected between the top surface, bottom surface, front side, and rear side; means for securedly and removably mounting the housing to and in a spaced arrangement vertically above the roof of a police car; at least one rotating light, at least one front running light, at least one rear running light, at least one siren and at least one antenna; the top surface of the housing including at least two apertures formed therein and at least one rotating light and at least one antenna mounted in the apertures; the rear side including at least one aperture formed therein and at least one rear running light mounted therein; the front side having at least two apertures formed therein and at least one front running light and at least one siren mounted in the apertures; left search light means pivotally mounted on the left end of the housing; first control cable means having one end operatively connected to the left search light means and having the other end extending through an aperture formed in the bottom surface of the housing to allow the control of the left search light means from the interior of the police car; right search light means pivotally mounted on the right end of the housing; second control cable means having one end operatively connected to the right search light means and having the other end extending through an aperture formed in the bottom surface of the housing to allow control of the right search light means from the interior of the police car; electrical wire means connected to the running lights, rotating lights, siren, antenna, and search lights, and extending through an aperture formed in the bottom surface to allow the selectional operation of each of the lights and siren from within the police car.

2. The police utility bar of claim 1, wherein indicia designating the particular police department by whom the police car is possessed are located on the rear side to thereby allow rapid and complete identification of the police car.

3. The police utility bar of claim 2, wherein the left end and the right end of the housing have extensions in a manner that the housing forms a "T" configuration wherein the left horizontal extension of the "T" supports the left pivotally mounted search light means and the right horizontal extension of the "T" supports the right pivotally mounted search light means.

4. The police utility bar of claim 3, wherein the top surface, bottom surface, rear side and front side are substantially flat and form a hollow parallelepiped portion of the housing.

5. The police utility bar of claim 4, wherein the means for mounting the housing includes a boss formed on the bottom surface of the housing, car rain gutter clamps, adjustable flexible straps extending between the car rain gutter clamps and the boss, arms extending frontward and rearward from the boss and suction cups affixed to the ends of the arms to support the arms and hence the utility bar.

6. The police utility bar of claim 1, wherein the left end and the right end of the housing have extensions in a manner that the housing forms a "T" configuration wherein the left horizontal extension of the "T" supports the left pivotally mounted search light means and the right horizontal extension of the "T" supports the right pivotally mounted search light means.

* * * * *